Feb. 27, 1962 — W. D. LYNCH — 3,022,768
BIRD FEEDER
Filed May 13, 1960
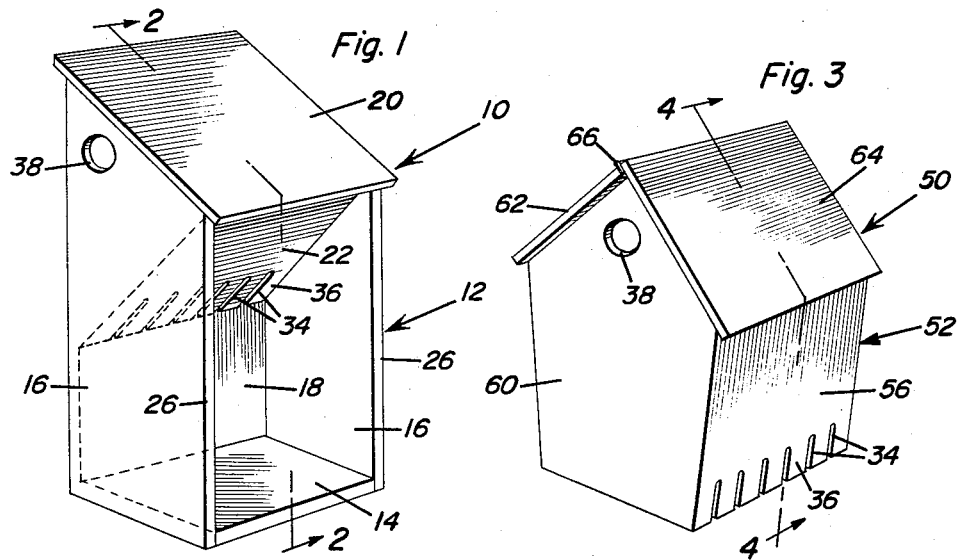
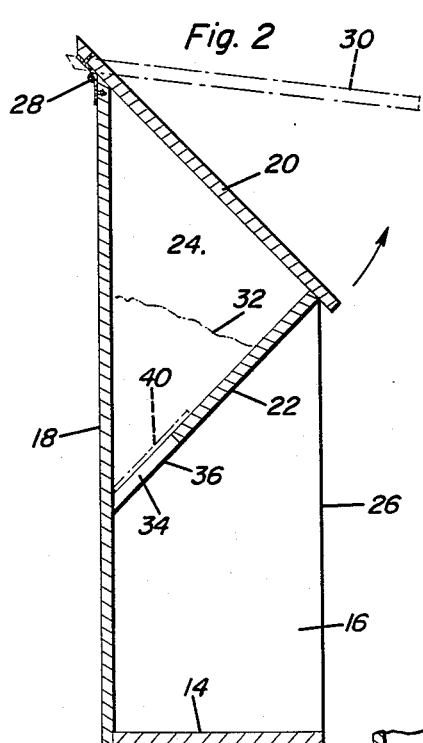
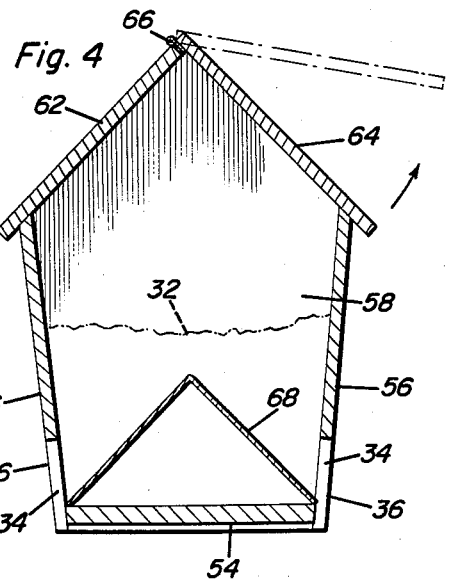
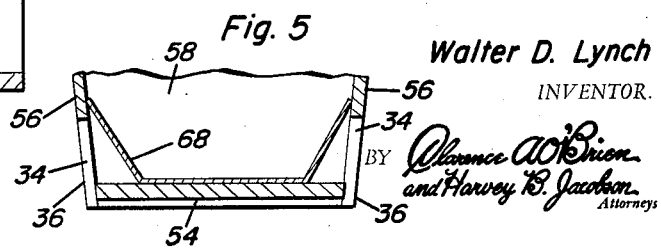
Walter D. Lynch
INVENTOR.

United States Patent Office 3,022,768
Patented Feb. 27, 1962

3,022,768
BIRD FEEDER
Walter D. Lynch, 931 W. Cherry St., Cherokee, Iowa
Filed May 13, 1960, Ser. No. 28,937
5 Claims. (Cl. 119—52)

This invention relates to new and useful improvements in bird feeders, and the principal object of the invention is to facilitate feeding of certain kinds of birds while preventing waste of feed to others, as for example, feeding of chickadees, woodpeckers, cardinals, et cetera, and non-feeding of English sparrows.

This object is attained by a particular structural arrangement of the feeder whereby non-desirable birds such as English sparrows, because of their physical characteristics in relation to the structure of the feeder, are prevented from obtaining feed therefrom, while other birds such as chickadees, et cetra, are capable to obtain the feed.

More specifically, the feeder in accordange with the invention is provided with a feed hopper having a wall formed with a plurality of slots which are not wide enough to permit feed to drop from the hopper by gravity, but are wide enough to permit birds to pick the feed through the slots. Along with this feature of the invention another important feature thereof resides in utilizing the portions of the aforementioned hopper wall between the slots as support means on which "clinging" type birds such as chickadees or woodpeckers may rest while picking the feed through the slots, while birds such as English sparrows cannot cling to the support means and are therefore prevented from gaining access to the feed.

Another important feature of the invention resides in the provision of a feeder having a housing which accommodates the feed hopper in its upper portion and also includes a bottom spaced below the feed slots of the hopper by such distance that relatively large birds such as cardinals may reach the feed in the slots while standing on the bottom of the housing, but relatively small birds such as English sparrows cannot do so.

Another important feature of the invention resides in providing the housing of the feeder with side panels which have the slotted wall of the hopper extending therebetween, the side panels being wide enough so that small birds such as English sparrows resting on front edges of the side panels cannot reach the slots in the hopper wall at the rear edges of such panels.

Another important feature of the invention resides in the provision of removable means in the hopper to function as a closure for the slots in the hopper wall, whereby the hopper of the feeder, when empty, may be used as a bird house, for example, for wrens, so that the device is of a year-round utility, serving as a feeder in fall and winter, and as a bird house in spring and summer.

Some of the advantages of the invention reside in its simplicity of construction, efficient operation, and in its adaptability to economical manufacture.

These together with other objects and advantages which will become subsequently appearent reside in the details of construction and operation as more fully hereinafter described and claimed, reference being had to the accompanying drawings forming a part hereof, wherein like numerals refer to like parts throughout, and in which:

FIGURE 1 is a perspective view of a bird feeder in accordance with the invention;

FIGURE 2 is a vertical sectional view on an enlarged scale, taken substantially in the plane of the line 2—2 in FIGURE 1;

FIGURE 3 is a perspective view of a modified form of the invention;

FIGURE 4 is an enlarged vertical sectional view, taken substantially in the plane of the line 4—4 in FIGURE 3; and FIGURE 5 is a fragmentary sectional view, similar to that shown in FIGURE 4 but illustrating the divider in its inverted position to facilitate use of the feeder as a bird house.

Referring now to the accompanying drawings in detail, more particularly to FIGURES 1 and 2, the bird feeder in accordance with the invention is designated generally by the reference numeral 10 and embodies in its construction a vertically elongated housing 12, including a bottom 14, a pair of side panels 16, a back panel 18, a top 20 and a wall 22 which constitutes the front side of a feed hopper 24 in the upper portion of the housing. As will be observed, the wall 22 extends transversely between the side panels 16 and is upwardly and outwardly sloped as shown, the bottom or lower edge of the wall 22 being disposed adjacent the back panel 18, that is, at the rear edges of the side panels 16, while the upper edge of the wall 22 is disposed at the front edges 26 of the side panels. The top 20 is suitably hinged to the back panel 18 as indicated at 28, whereby the top may be swung upwardly as shown by the dotted lines 30 to facilitate filling of the hopper with bird feed, indicated at 32.

The bottom or lower edge portion of the wall 22 is provided with a row of spaced, upwardly extending slots 34 which are not wide enough to permit the feed 32 in the hopper to drop downwardly therefrom by gravity, but are wide enough to permit the feed to be picked through the slots by birds of the "clinging" type such as chickadees, woodpeckers, et cetera, resting on portions 36 of the wall 22 between the slots 34, which portions thus function as support elements for such birds. Also, the feed in the hopper may be picked through the slots 34 by larger birds such as cardinals standing on the bottom 14 of the housing, the distance of the slots above the bottom 14 being such that these relatively large birds may reach the feed through the slots but relatively smaller birds such as English sparrows are not able to do so while standing on the bottom 14. Moreover, the side panels 16 are sufficiently wide that such birds resting on the front edges 26 of the side panels cannot reach back far enough to pick the feed through the slots, so that wastage of feed is materially minimized, if not altogether prevented.

The housing 12 is provided in one of the side panels 16 with an opening 38 communicating with the interior of the hopper 24, so that when the hopper is empty and the feeder is not used as such during spring or summer, it may function as a bird house for wrens, or the like. In such event, the slots 34 may be closed by a suitable closure plate 40, removably positioned in the bottom of the hopper against the inside surface of the wall 22, as will be readily apparent.

In the modified form of the invention shown in FIGURES 3–5 and designated generally by the numeral 50, the housing 52 consists of a bottom 54, a pair of upwardly and outwardly sloping side panels 56, a back panel 58, a front panel 60 and a top including a fixed panel 62 and an openable panel 64 hinged as at 66. The lower edge portions of the side panels 56 are provided with the slots 34 and support elements 36 therebetween as in the embodiment 10, and the front panel 60 is formed with the opening 38 to facilitate use of the housing as a bird house when it is not used as a feeder.

An inverted V-shaped divider 68 of cardboard, or the like, is removably positioned in the bottom portion of the housing as shown in FIGURE 4 so that the feed therein may be guided to the slots in the opposite sides of the housing, and when the device is used as a bird house, the divider 68 is inverted and folded as shown in FIG- URE 5, whereby to provide closure means for the slots 36.

The foregoing is considered as illustrative only of the principles of the invention. Further, since numerous modifications and changes will readily occur to those skilled in the art, it is not desired to limit the invention to the exact construction and operation as shown and described, and accordingly, all suitable modifications and equivalents may be resorted to, falling within the scope of the invention as claimed.

What is claimed as new is:

1. In a bird feeder, a housing affording a feed hopper therein and including a pair of upwardly and outwardly sloping side walls provided in their bottom edge portions with rows of spaced upwardly extending slots, said slots communicating directly with the interior of the hopper and being of a width insufficient to permit dropping of feed from the hopper by gravity but sufficient to permit the feed to be picked by birds through said slots, portions of said walls between said slots constituting support elements for birds picking the feed through the slots, and an inverted V-shaped divider positioned in the bottom portion of said hopper for guiding feed to the slots.

2. The device as defined in claim 1 wherein said divider in invertible in said hopper to provide a closure for said slots.

3. In a bird feeder, a housing affording a feed hopper therein and including a pair of upwardly and outwardly sloping side walls provided in their bottom edge portions with rows of upwardly extending slots in direct communication with the interior of the hopper, portions of said walls between said slots constituting support elements for birds picking feed from the hopper through said slots, and a combined invertible feed guiding and slot closing member positioned in the bottom portion of said hopper for selectively guiding feed in the hopper to said slots and closing the slots.

4. In a bird feeder, a housing affording a feed hopper therein and including a bottom, front and back walls and a pair of side walls extending upwardly from said bottom, said side walls being provided in their bottom edge portions with sets of spaced upwardly extending slots communicating directly with the interior of the hopper, portions of the side walls between said slots constituting support elements for birds picking feed from the hopper through the slots, and an invertible insert positioned on said bottom in the hopper and including a pair of slanting surfaces, said surfaces in one position of said insert sloping downwardly and laterally from the interior of the hopper in opposite directions toward the lower end portions of said slots in said side walls for guiding feed from the hopper through the slots and in an inverted position of the insert said surfaces sloping upwardly from said bottom to portions of the side walls above the slots for closing the latter.

5. The device as defined in claim 4 wherein said insert is formed from deformable material.

References Cited in the file of this patent

UNITED STATES PATENTS

| | | |
|---|---|---|
| 2,195,575 | Mallgraf | Apr. 2, 1940 |
| 2,230,058 | Hornung | Jan. 28, 1941 |
| 2,666,415 | Scruggs | Jan. 19, 1954 |
| 2,673,551 | McAnly | Mar. 30, 1954 |
| 2,827,876 | Trobaugh | Mar. 25, 1958 |
| 2,842,096 | Bradfield | July 8, 1958 |
| 2,890,681 | Sack | June 16, 1959 |